April 5, 1932. C. B. GRAY 1,852,881
REMINDER CALENDAR
Filed March 8, 1930  2 Sheets-Sheet 1

Inventor.
Calvin B. Gray
By Stone, Boyden, Mack
Attorneys

Figure 4:
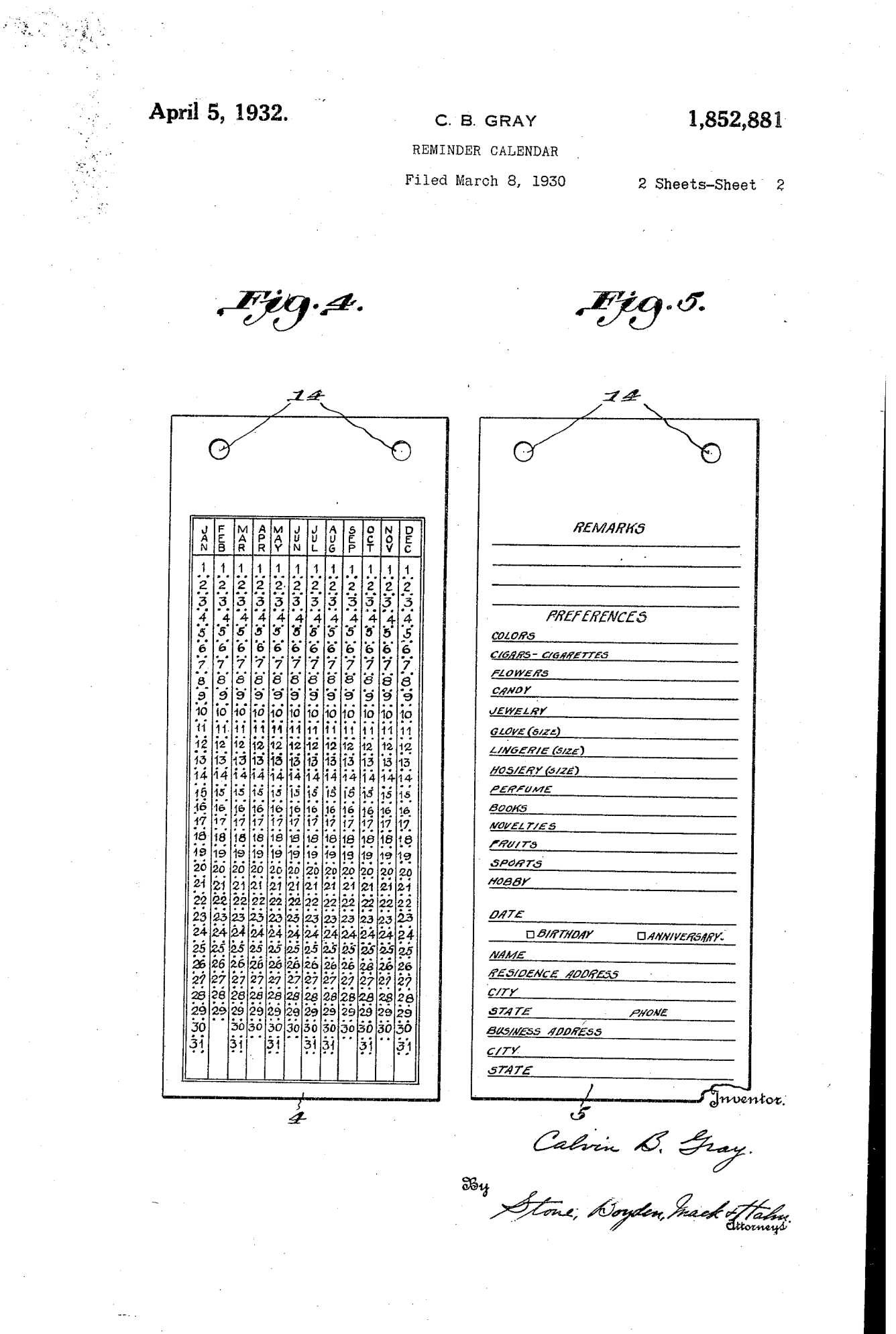

April 5, 1932.  C. B. GRAY  1,852,881

REMINDER CALENDAR

Filed March 8, 1930   2 Sheets-Sheet 2

Inventor.
Calvin B. Gray.
By Stone, Boyden, Mack & Hahn
Attorneys

Patented Apr. 5, 1932

1,852,881

UNITED STATES PATENT OFFICE

CALVIN B. GRAY, OF WILMINGTON, DELAWARE

REMINDER CALENDAR

Application filed March 8, 1930. Serial No. 434,361.

This invention relates to a reminder calendar, and more particularly to that type of reminder calendar embodying a series of leaves held together in pad form for receiving memoranda of a personal nature, and a single-sheet date calendar for presenting the calendar information.

One object of this invention is to provide a means of recording and tabulating personal data on a series of personal-item memoranda leaves so that the data may be readily brought to the attention of the user by merely referring to a date-calendar sheet held together with the leaves in pad form.

Another object of this invention is to provide a concise single-sheet permanent date calendar, whereby a given date in any month may be readily singled out at a glance and underscored by the user, without the necessity of searching through a series of calendar leaves.

Other and further objects and advantages of this invention will appear as the description proceeds.

The invention consists of the features of construction, combination, and arrangement of parts herein fully described and claimed, reference being had to the accompanying drawings in which:

Fig. 4 is a plan view of the date calendar sheet; and

Fig. 5 is a plan view of one of the personal-item memoranda leaves.

Figures 1, 2, 3:
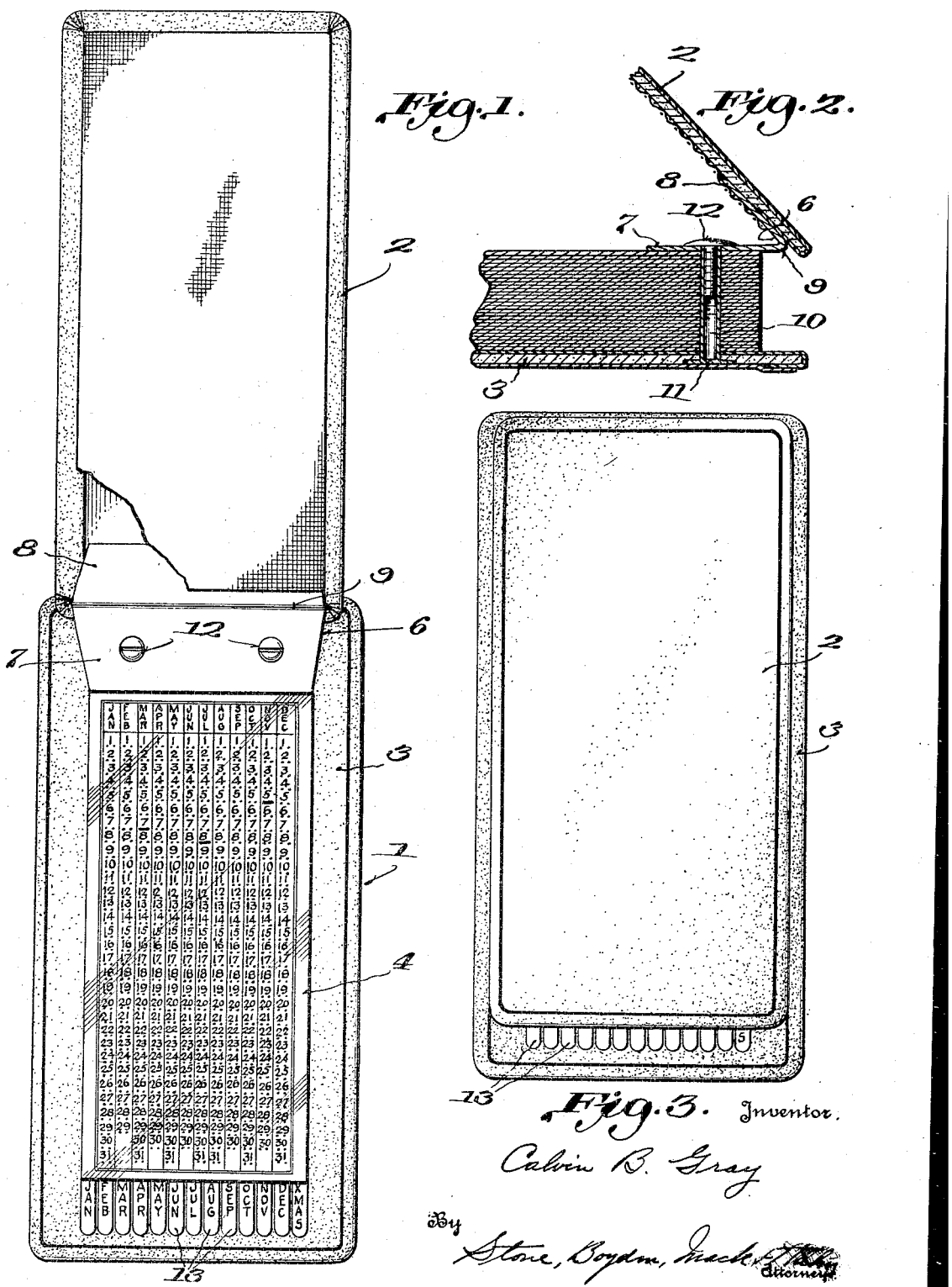
Fig. 1 is a plan view of the reminder calendar with the cover turned back, a portion being shown broken away.
Fig. 2 is a fragmentary longitudinal vertical section through the reminder calendar in the region of one of the screw elements.
Fig. 3 is a plan view of the reminder calendar with the cover closed.

Referring to the drawings, 1 designates a reminder calendar having cover 2 and base 3, a single-sheet date calendar 4 and a series of personal-item memoranda leaves 5. The leaves 5 and the date-calendar 4 are secured together in pad form. A hinge 6 having lower and upper marginal securing portions, 7 and 8, respectively, and flexible intermediate portion 9 serves to foldably connect the cover 2 with the remainder of the pad. The lower marginal securing portion 7 of the hinge and the date-calendar 4 and personal item memoranda leaves 5 in the vicinity of the upper edges thereof all have a pair of perforations 14 therein to receive the securing-means. This latter consists of an internally-threaded tubular shank 10 fastened to the base 3 by an enlarged head portion 11 thereof, and projecting uprightly from the base 3 and from its head portion 11, and through the perforations in the leaves 5, date-calendar 4 and lower marginal securing portion 7 of the hinge 6, and of a supplemental screw-element 12 which is externally-threaded and coacts with tubular shank 10. The upper marginal securing portion 8 of hinge 9 is permanently secured to the upper edge of cover 2 by means of adhesive or in any other conventional manner.

It will be noted from Fig. 2 that the lower marginal securing portion 7 of hinge 6 projects outward beyond the line of the top edges of the personal-item memoranda leaves 5 and date-calendar 4, and that the top edge of the cover 2 projects still farther outwardly beyond the line of the top-edges of the personal-item memoranda leaves 5 and date-calendar 4, so that the flexible intermediate portion 9 of the hinge 6 is spaced outwardly from the same, and is at the same time spaced inwardly from the top edge of cover 2. This arrangement provides a hinge-connection which will permit of bending the cover as far back as necessary without wear on any part of the reminder calendar except the hinge.

The cover 2 and back 3 are preferably rigid, and may consist of rigid backings covered with any conventional flexible bindings, and lined on one surface with parchment or like material, as is well known in the bookbinding art, or may consist of suitable rigid uncovered backings made, for example, from pyralin or the like.

Referring now to an arrangement which is believed to be distinctly novel, the date-calendar 4, as shown in Fig. 4, consists of a single sheet having printed thereon all the dates for a whole year. Printed notations of the months, in calendar order, extend in a row, either vertically or horizontally, as shown, as headings, and from each of these printed month notations extends a row of printed numerals, each representing the days of the month, there being, of course, twelve rows of numerals in all, each row being numbered from 1 to 31. Beneath each printed numeral there is a space, and in such space are printed guide indicia, which may consist, for example, of a pair of horizontally-disposed dots to permit underscoring of a numeral by drawing a line from one to the other of the horizontally-disposed dots.

The most important feature of the invention consists in the relation between the single-sheet date-calendar and the personal-item memoranda leaves 5, thus established with the aid of the index tabs, as hereinafter described.

As shown in Fig. 5, each personal-item memoranda leaf 5 is provided with predetermined spaces and printed notations adjacent the spaces, each printed notation serving to identify the type of data admissible to its respective space, to serve as a reminder of a particular desired phase of the significance of a date which is underscored, or which it is desired to underscore, on the date-calendar 4. The personal-item memoranda leaves 5 are arranged by months, there being a group of leaves for each month, so that as many days as desired in a month may, by underscoring on date-calendar 4, be identified by complete tabulated item-lists on the personal-item memoranda leaves 5. Each of these leaves 5 presents a tabulated item-list form for personal hobbies, preferences, and the like, and designates the name, residence, business address, phone number, etc. of an individual whom it is desired to remember on a particular day, and the spaces are filled in according to the individual data, there also being provided a space for the inscription of remarks or miscellaneous notes.

Means are also provided for enabling the user to turn to any personal-item memoranda leaf 5 after selecting an underscored numeral on the date-calendar. This means consists of a plurality of index tabs 13 identifying groups of personal-item memoranda leaves by order of groups of months of the year, there being one tab 13 for each month affixed to the top leaf for that particular month, and projecting beyond the outline of the pad and visible from above the pad, each tab 13 being identified by a printed notation of the month which is desired to be designated, and the tabs being arranged in staggered relation downwardly in order of the months, there being twelve month groups in all.

It can thus be readily seen that by glancing along a certain month-row on the date-calendar 4 until an underscored date numeral is reached, the personal-item memoranda leaf 5 corresponding thereto may be easily selected by locating the index tab 13 corresponding to that particular month group which registers with the day numeral month row on the date-calendar whereby all the leaves thereabove are turned back, and the leaves pertaining to that month group together with the top or initial leaf for the month, to which the index tab is attached, may be readily thumbed over and inspected, and the particular leaf pertaining to the underscored date may be selected, or a leaf appropriate to any future date may be reached for the inscription of memoranda.

Claims to the details of the book binder construction and hinge features are presented in the copending application Serial 557,654, filed August 17, 1931.

I claim:

1. In a reminder calendar, a single-sheet date-calendar divided by a horizontal line into upper and lower divisions, and by vertical lines into twelve vertical divisions, the said upper, lower, and vertical divisions forming twelve upper zones above and twelve lower zones below the horizontal line, the lower zones being alined with the upper zones, each of the upper zones forming a space containing a printed notation denoting a month of the year, and each of the twelve lower zones forming a space containing printed numerals denoting all the days of that month in the upper zone alined therewith, the printed notations in the upper zones and the printed numerals in the lower zones being arranged in order of calendar rotation, and a series of month-groups of personal item memoranda leaves, said personal item memoranda leaves and said date-calendar being secured together in pad form, and a plurality of index signs identifying groups of memoranda leaves by order of months of the year and located one sign each with each month group of leaves, and each sign bearing the designation of the corresponding month of the calendar to which the group it identifies pertains, said signs extending in sequence across the bottom of the pad.

2. In a reminder calendar, a single-sheet date-calendar divided by a horizontal line into upper and lower divisions and by vertical lines into twelve vertical divisions, the said upper, lower, and vertical divisions forming twelve upper zones above and twelve lower zones below the horizontal line, the lower zones being alined with the upper zones, each of the upper zones forming a space containing a printed notation denoting a month of the year and each of the twelve lower zones forming a space containing printed numerals denoting all the days of that month intended for reception in the upper zone alined therewith, the printed notations in the upper zones and the printed numerals in the lower zones being arranged in order of calendar rotation, and a series of month-groups of personal item memoranda leaves, said personal item memoranda leaves and said date-calendar being secured together in pad form, and a plurality of index tabs identifying groups of personal item memoranda leaves by order of months of the year, projecting beyond the outline of the pad across the end of the pad and visible from above the pad and located at the foot of the pad with respect to the printing on the calendar and having a printed notation of the months on the respective tabs, each tab being affixed to the initial leaf of the month-group which it respectively identifies.

In testimony whereof I affix my signature.

CALVIN B. GRAY.